United States Patent [19]

Potter

[11] Patent Number: 4,639,003
[45] Date of Patent: Jan. 27, 1987

[54] POSITIVE LOCK MECHANISM FOR MOVING BOARD

[76] Inventor: Roger A. Potter, 6460 Windham Ave., Alexandria, Va. 22310

[21] Appl. No.: 827,966

[22] Filed: Feb. 10, 1986

[51] Int. Cl.$^4$ .............................................. B62B 5/04
[52] U.S. Cl. ...................................... 280/5.24; 188/5; 280/12 M
[58] Field of Search ................... 280/5.24, 5.22, 5.32, 280/12 AB, 605, 12 M; 188/8, 5

[56] References Cited

U.S. PATENT DOCUMENTS

| | | | |
|---|---|---|---|
| 1,714,352 | 5/1929 | Echola | 280/605 |
| 2,347,441 | 4/1944 | Snow | 280/605 |
| 2,456,002 | 12/1948 | Jonette | 280/605 |
| 3,015,123 | 1/1962 | Descarries | 280/5.2 |
| 4,130,291 | 12/1978 | Salthre et al. | 280/5.22 |
| 4,504,071 | 3/1985 | Drummond | 280/5.24 |

FOREIGN PATENT DOCUMENTS 347441  1/1922  Fed. Rep. of Germany ..... 280/5.24

Primary Examiner—David M. Mitchell
Attorney, Agent, or Firm—Walter F. Wessendorf, Jr.

[57] ABSTRACT

Disclosed is a positive lock mechanism for use with a moving board to move an object up or down stairs by sliding such moving board over the crests of the stairs. The positive lock mechanism comprises a shaft, spade element and torsion spring. The moving board freely mounts the shaft which carries the spade element and torsion spring. The torsion spring biases the spade element to a retractable positive lock position for engagement with a stair tread whereby the moving board and its load can remain in a free standing position of rest on the stairs. The moving board may be slid up or down over the crests of several steps before the spade element is allowed to engage a stair tread in positive lock position, or the movers may take one step at a time by allowing the spade element to engage each step successively.

2 Claims, 4 Drawing Figures

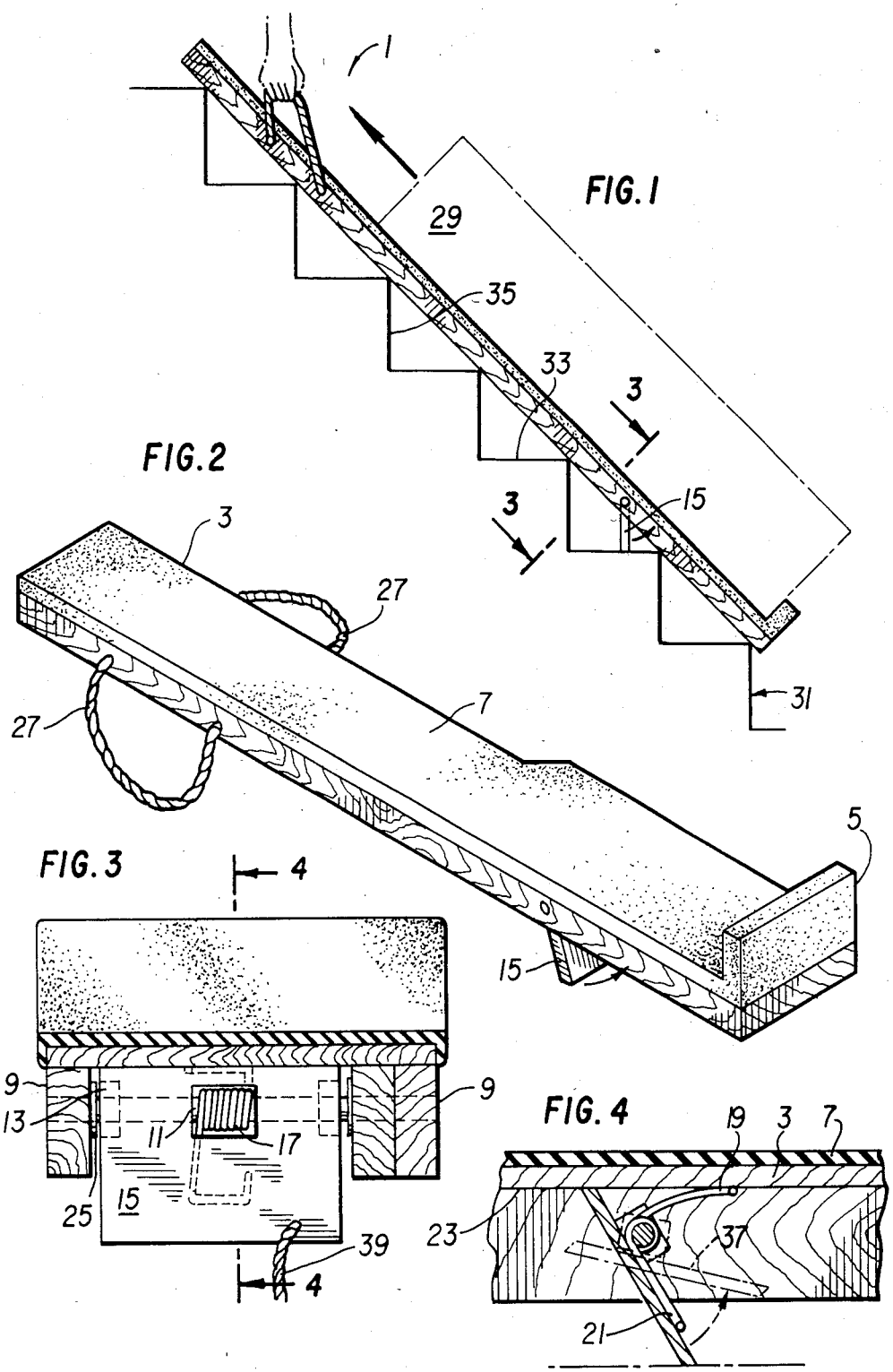

POSITIVE LOCK MECHANISM FOR MOVING BOARD

BACKGROUND

1. Technical Field

This invention relates to a positive lock mechanism for use with a moving board or piano board for use in sliding a heavy object or piano up or down over the crests of a flight of stairs, and such that during such sliding procedure the positive lock mechanism automatically allows the moving board with its load to be rested "free standing" at any or all steps without the intervention or application of any force on the part of the movers to hold the load on the stairs.

2. Background

A piano board is utilized to move a piano up or down a flight of stairs by sliding the runners of such piano board over the crests of the stairs. This not only entails exhausting work effort on the part of the piano movers, but also introduces a safety problem. Inasmuch as a piano has considerable weight and inasmuch as the piano is sliding, via the piano board, either up or down stairs, there remains the ever present danger of the piano movers losing control of the load and crushing or otherwise injuring the piano mover below, as well as damaging the piano.

Hence, the problem in the art to which this invention apertains is the need for a positive lock mechanism for the piano board whereby the piano board, whether in ascent or descent, can be stopped at any or all steps in a state of rest in free standing positive lock position to give the piano movers a chance to rest or for whatever purpose.

SUMMARY OF THE INVENTION

Accordingly, the object of the invention is to contribute to the solution of the discussed problem of the art by providing a positive lock mechanism comprising a spade element depending from the piano board and fixedly carried by a cross shaft mounted in bearing relationship by and between runners which depend from the platform of such piano board. A torsion spring, carried on the cross shaft, biases the depending spade element into its positive lock position such that the spade element engages a stair tread. In such positive lock position of the spade element engaging a stair tread, the piano board with a piano loaded thereon remains at rest in free standing position of the stairs.

BRIEF DESCRIPTION OF THE DRAWINGS

This object and other objects of the invention should be discerned and appreciated by reference to the drawings, wherein like reference numerals apply to similar parts throughout the several views, in which:

FIG. 1 is a side elevation of the invention in its ascent position;

FIG. 2 is a perspective view of the invention;

FIG. 3 is a sectional view taken along the line and in the direction of the arrows 3—3 in FIG. 1;

FIG. 4 is a sectional view taken along the line and in the direction of the arrows 4—4 in FIG. 3.

DESCRIPTION OF THE PREFERRED EMBODIMENT

In FIG. 1 of the drawings, reference numeral 1 generally refers to the invention of the moving board with its positive lock mechanism. The moving board is shown as a sled-type piano board having a flat platform 3 with an upstanding foot 5 at one end. Platform 3 and foot 5 are covered by appropriate padding 7. Fixedly depending from platform 3 are longitudinal runners 9. Appropriately carried in transverse relationship with runners 9 is a cross shaft 11 freely received by bearings 13 carried by a depending spade element 15. A torsion spring 17, operatively mounted on cross shaft 11, has tails 19 and 21 in abutting relationship with and operative engagement against the lower surface 23 of platform 3 and against spade element 15, and thereby constrains rotation of spade element 15 in a clockwise direction, as viewed in FIGS. 1, 2 and 4. As shown in FIG. 4, lower surface 23 of platform 3 functions as a limit stop to prevent further clockwise rotation of spade element 15. Spacer washers 25, carried on cross shaft 11, are interposed between the runners 9 and spade element 15, as shown. Rope handles 27 are provided on the lateral sides of the runners 9.

In FIG. 1, an object 29 is shown disposed on the piano board for ascent of the flight of stairs 31. The object 29, such as a piano, is appropriately secured to the piano board such as by strapping or lashing same thereto. Spade element 15 is shown in its positive lock position engaged with a stair tread 33. In such positive lock position, the piano board can remain free standing on the stairs 31 without the attention or intervention of the piano movers.

In ascent, the runners 9 are slid upward a sufficient distance over the crests of the stairs 31 (i.e., the external junctions of the treads 33 and risers 35) such that spade element 15 can engage the next higher tread 33. In sliding the runners 9 upward over the stair crests, riser 35 and then the next higher crest will engage such spade element 15 and cause same to rotate counterclockwise to its retracted position, as indicated by the phantom lines 37 in FIG. 4. When spade element 15 passes beyond such next higher crest, the restoring force of torsion spring 17 will cause spade element 15 to rotate clockwise; and, when the runners 9 have been slid upwardly over the crests a further distance, spade element 15 will rotate clockwise to its furthest extent to its positive lock position and will be engaged with the next higher stair tread 33. Spade element 15 is appropriately padded (not shown) to prevent same from digging into or otherwise damaging the stairs 31.

In descent, with the object 29 secured to the piano board, the piano board with its secured object is placed at the top of the stairs 31 and is cantilevered over the top-most step until the runners 9 lie upon the crests of the stairs 31. The runners 9 will slide downward until spade element 15 engages a stair tread 33 in positive lock position. In such positive lock position, the piano board will remain free standing on the stairs 31 without the attention or intervention of the piano movers. To resume sliding the runners 9 downward over the crests of the stairs 31, the piano board is pushed upwards a sufficient distance to free spade element 15 from engagement with such stair tread 33 and to allow spade element 15 to clear tread 33 in order to rotate spade element 15 counterclockwise to its retracted position 37 by appropriately pulling lanyard 39 carried by spade element 15. Thereupon, the piano movers have the choice of sliding the piano board downward one step or several steps before lanyard 39 is released to allow spade element 15 to rotate clockwise to its positive lock position to engage a stair tread 33.

Having thusly described my invention, I claim:

1. A piano board for carrying a piano and for use in sliding said piano, either in ascent or descent, over the crests of a flight of stairs with said piano board having a depending spade element to automatically allow said piano board to be rested freestanding, whether in such ascent or descent, at any one or all of the steps of said flight of stairs without the intervention or application of force on the part of any human operator to physically hold said piano board with its piano carried thereon in its rested position on the stairs; said piano board comprising a flat platform, foot, longitudinal runners, cross shaft, depending spade element, torsion spring and lanyard; said piano board being of the sled type and having said flat platform, said flat platform having a lower surface, said flat platform having terminal ends, said foot being upstanding from one of said terminal ends of said flat platform, said longitudinal runners depending from said platform, said runners freely carrying said cross shaft in transverse relationship therewith, said spade element having proximal and distal ends, said cross shaft freely mounting thereon said spade element in pivotal relationship between its said proximal and distal ends with said spade element thereby functioning as a first order lever, said cross shaft freely mounting thereon said torsion spring, said torsion spring having tails at its remote ends, said spring tails being in abutting relationship against and operative engagement with said lower surface of said flat platform and said spade element to constrain said spade element to rotate in one direction, said lower surface of said flat platform functioning as a limit stop to prevent further constrained rotation of said spade element upon said proximal end of said spade element abutting said lower surface of said flat platform, said lanyard being operatively connected to said spade element and, upon said lanyard being pulled sufficiently by a human operator and held as pulled, said spade element being caused to rotate to its retracted position between and within said longitudinal runners; upon ascent of said piano board over a flight of stairs: said runners sliding upwardly upon and over the crests of said flight of stairs, and the step riser before the next higher crest and said next higher crest, engageable by said spade element, engaging said spade element and causing said spade element to rotate in one direction towards its retracted position, and, upon said spade element passing beyond said next higher crest, the restoring force of said spring causing said spade element to rotate in the direction opposite to its retracted position to its position of automatic engagement and positive lock with said distal end of said spade element engaging the stair tread after said next higher crest and with said proximal end of said spade element abutting said lower surface of said flat platform; and upon descent of said piano board over a flight of stairs: said lanyard being pulled sufficiently by a human operator and being held as pulled to cause said spade element to be rotated to its said retracted position, and said runners sliding downwardly upon and over the crests of said flight of stairs to the next lower step engageable by said spade element, and, upon said lanyard being manually released by the human operator, the restoring force of said spring automatically causing said spade element to rotate to its position of automatic engagement and positive lock with said distal end of said spade element engaging the stair tread of said next lower step with said proximal end of said spade element abutting said lower surface of said flat platform.

2. A piano board in accordance with claim 1, wherein said runners have lateral sides, wherein are further provided handles and wherein said lateral sides carry said handles.

* * * * *